United States Patent
Nakamura (10) Patent No.: US 7,561,212 B2
(45) Date of Patent: Jul. 14, 2009

(54) DIGITAL BROADCAST RECEIVING APPARATUS AND RECEIVING METHOD

(75) Inventor: Naohito Nakamura, Tokyo (JP)

(73) Assignee: Sony Corporation, Tokyo (JP)

(*) Notice: Subject to any disclaimer, the term of this patent is extended or adjusted under 35 U.S.C. 154(b) by 444 days.

(21) Appl. No.: 10/563,617

(22) PCT Filed: Jul. 9, 2004

(86) PCT No.: PCT/JP2004/009827

§ 371 (c)(1),
(2), (4) Date: Apr. 26, 2006

(87) PCT Pub. No.: WO2005/006695

PCT Pub. Date: Jan. 20, 2005

(65) Prior Publication Data

US 2007/0060184 A1   Mar. 15, 2007

(30) Foreign Application Priority Data

Jul. 9, 2003   (JP)   ............................. 2003-272434

(51) Int. Cl.
*H04N 5/44* (2006.01)
*H04B 17/00* (2006.01)

(52) U.S. Cl. .................. 348/725; 375/224; 375/227; 455/226.3; 455/226.1

(58) Field of Classification Search ................. 348/725, 348/726, 731, 732, 733; 375/329, 279, 326, 375/332, 224–226, 346, 338; 455/226.1–226.4; 370/333, 332, 334; 714/49, 704
See application file for complete search history.

(56) References Cited

U.S. PATENT DOCUMENTS 6,993,096 B1 *   1/2006   Shiraishi et al. ............. 375/329

FOREIGN PATENT DOCUMENTS

| JP | 64-072650   | 3/1989 |
|----|-------------|--------|
| JP | 02-046045   | 2/1990 |
| JP | 11-225124   | 8/1999 |
| JP | 2000-101666 | 4/2000 |
| JP | 2000-138722 | 5/2000 |
| JP | 2003-018230 | 1/2003 |
| JP | 2004-179825 | 6/2004 |

* cited by examiner

*Primary Examiner*—M. Lee
(74) *Attorney, Agent, or Firm*—Oblon, Spivak, McClelland, Maier & Neustadt, P.C.

(57) ABSTRACT

A factor in deterioration of receiving characteristics of an antenna is automatically determined and automatically improved. In an apparatus for receiving digital broadcast signal, when receiving the signal, a received signal sent from the antenna 1 is orthogonally detected to a baseband signal; an average value of amplitude in radial direction of signal points of phase mapping of the baseband signal is then measured to calculate a C/N value for the received signal; an average value of amplitude in circumferential direction of signal points of the phase mapping of the baseband signal is measured to calculate an amount of phase noise of the received signal; a bit-error rate of transport stream that is given by demodulating the baseband signal is then measured; a factor in deterioration for receiving characteristics of the antenna is determined based on these results; and a desired measure mode is set based on the determination result thereof.

7 Claims, 6 Drawing Sheets

DIGITAL BROADCAST RECEIVING APPARATUS AND RECEIVING METHOD

TECHNICAL FIELD

The present invention relates to an apparatus and a method for receiving digital broadcast signal, which receive digital satellite broadcast signal via an antenna.

BACKGROUND ART

A television broadcast receiver has conventionally been available to receive an analog broadcast signal such as a VHF/UHF broadcast signal via terrestrial broadcast and a signal for broadcasting satellite (BS) utilizing any broadcast satellite. A television broadcast receiver that can receives a BS digital signal or a communication satellite (CS) digital signal utilizing any broadcast satellite has recently been put to practical use. When using such the television broadcast receiver, an antenna that has been used for conventional BS analog may have been often used as it is for receiving BS digital signal.

For conventional BS analog there has been strong immunity against FM residual noise because of its FM modulation so that even if an antenna having a large amount of phase noise by its local oscillation is used, it can receive a signal properly. Thus, an antenna that has been 1 conventionally used for BS analog may be used for BS digital as it is, but when the above antenna having a large amount of phase noise is used for BS digital, there has been weaker immunity against noise than that in a case of BS analog because BS digital is modulated using an eight-phase-shift-keying (8PSK) modulation scheme, so that its receiving characteristics may be deteriorated.

Figure 1:
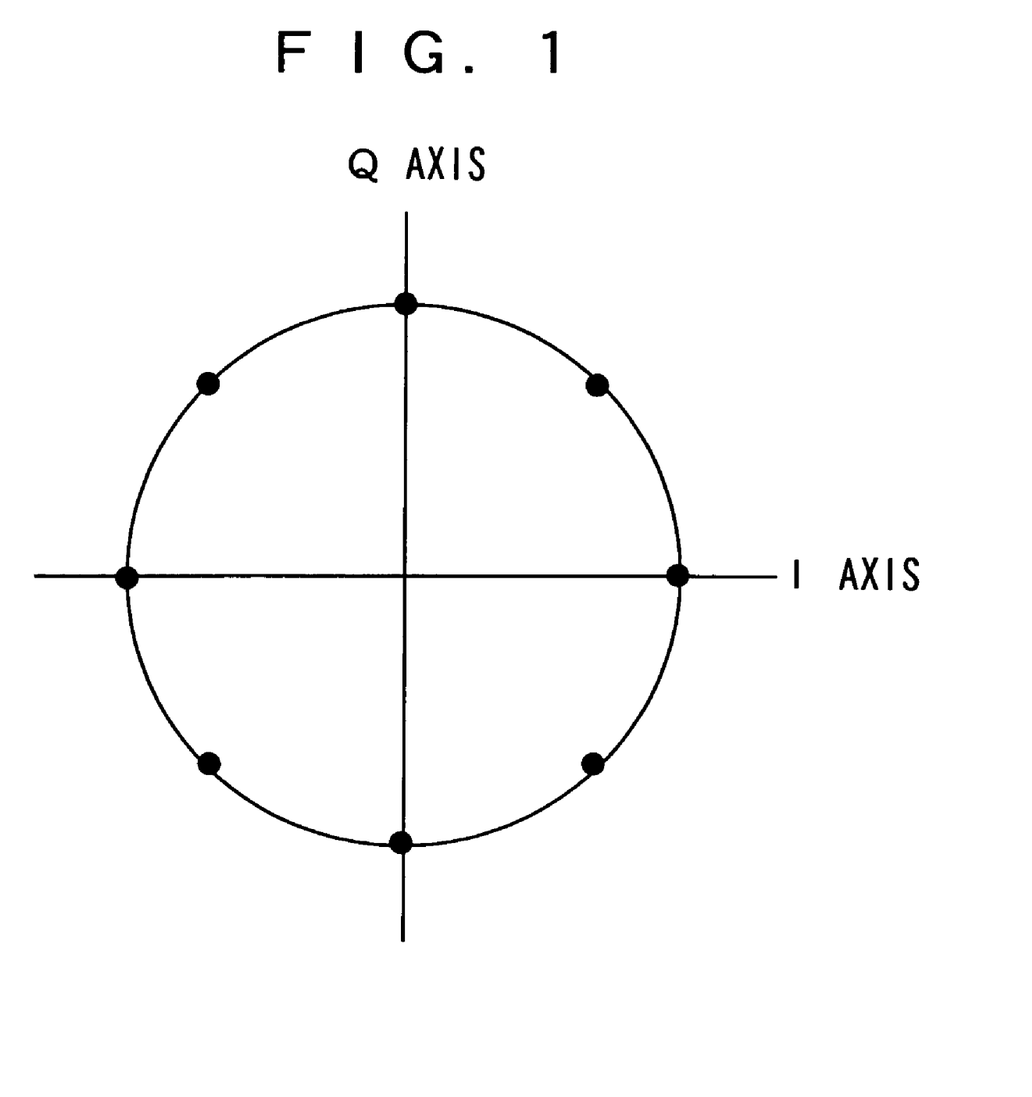
FIG. 1 is a diagram for illustrating an arrangement for signal points of phase mapping of baseband signal.

FIG. 1 is a diagram for illustrating an arrangement for signal points of a baseband signal by the 8PSK modulation. In this 8PSK modulation, eight phase equalization points are used to transmit information of three bits for every symbol. If numbers of the phase equalization in PSK is increased, an amount of information for every symbol is increased, but possibility that it is erroneously received as an adjacent signal point under the influence of noise etc. is also increased.

Figure 2:
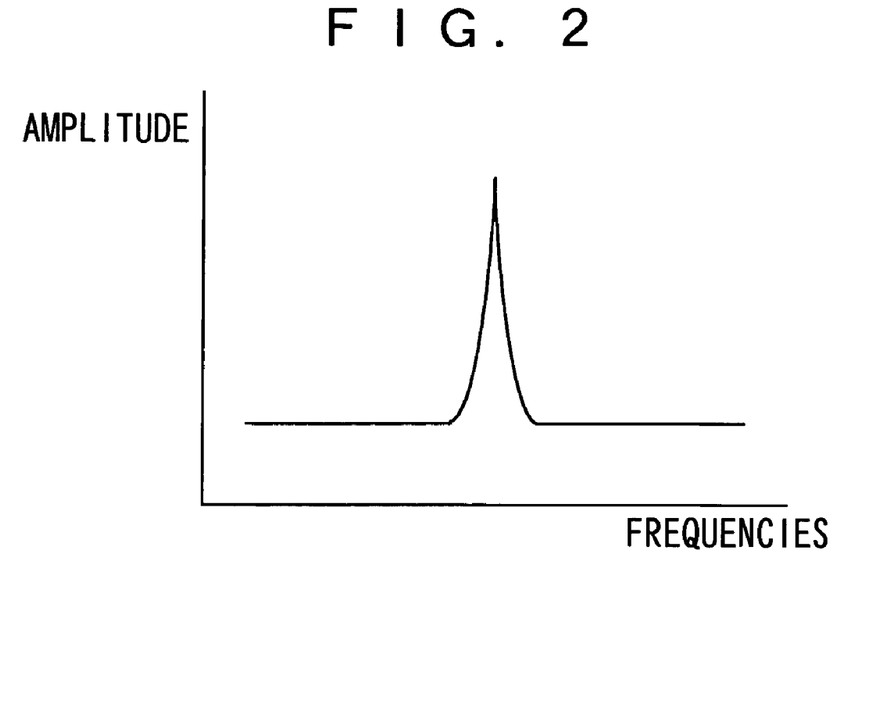
FIG. 2 is a diagram for illustrating oscillation spectrum when local oscillator oscillates normally.
Figure 3:
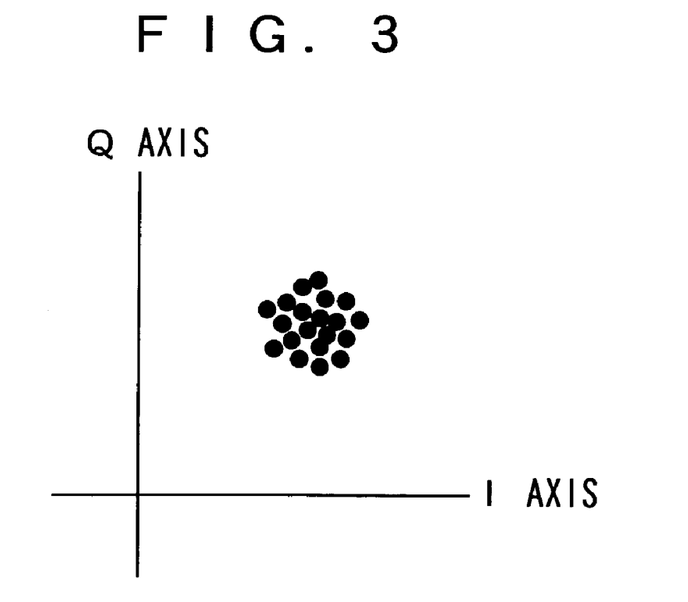
FIG. 3 is a diagram for illustrating a situation of signal points when random noise occurs.

Really, if local oscillator may oscillates normally, signal points of the baseband signal spreads from any one based on random noise, thereby resulting in low Carrier to Noise (C/N) ration. FIG. 2 is a diagram for illustrating oscillation spectrum when a local oscillator oscillates normally. FIG. 3 is a diagram for illustrating a situation of signal points when the random noise occurs. If C/N ratio is decreased, an error amount of transport stream of demodulation IC output is increased so that a bit-error rate may be deteriorated to finally reach any deterioration of receiving characteristics such that block noise can occur in a screen.

Figure 4:
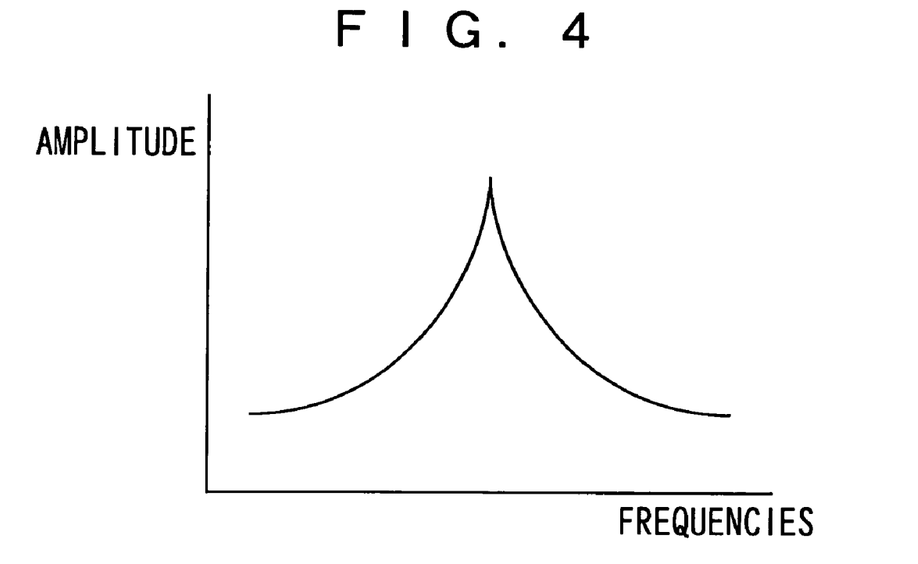
FIG. 4 is a diagram for illustrating oscillation spectrum when oscillation including high phase noise occurs.
Figure 5:
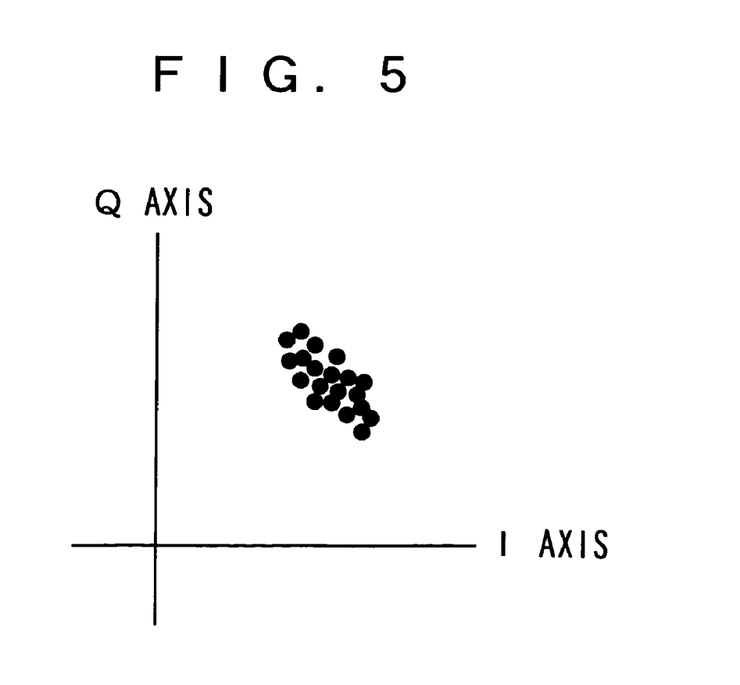
FIG. 5 is a diagram for illustrating a situation of signal points when phase noise occurs.

FIG. 4 is a diagram for illustrating oscillation spectrum when high phase noise is included. FIG. 5 is a diagram for illustrating a situation of signal points when phase noise occurs. As using the antenna having a large amount of noise as described above, the phase noise is overlapped with the received signal as it is, but signal points of phase mapping of the baseband signal spread in a circumferential direction as shown in FIG. 5 because phase noise includes noise component having any distortion in a frequency component thereof. This is because probability that demodulator may erroneously determine it as an adjacent signal point is increased since there is a shorter distance between the signal points of the baseband signal, thereby resulting in augmentation of errors in output transport stream (TS).

Constellation in a case where phase noise in a local oscillator is impaired has been recently studied and it has been also reported that as disclosed in, for example, "QAM FOR TERRESTRIAL AND CABLE TRANSMSSION" by David A. Bryan, IEEE Trans. on Consumer Electronics, Vol. 41. No.3, August 1995 (see pages 385 and 86 and FIG. 4), signal points of phase mapping of the baseband signal spread in a circumferential direction.

Figure 6:
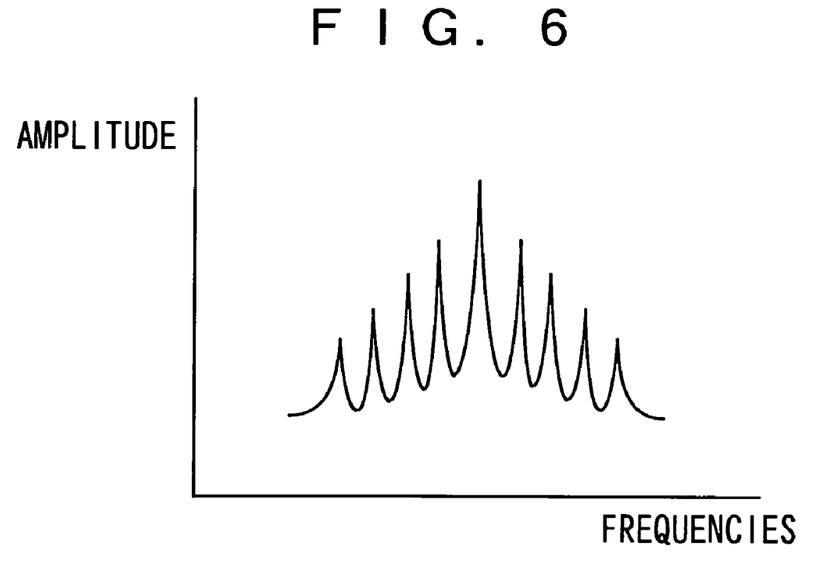
FIG. 6 is a diagram for illustrating oscillation spectrum when the parasitic oscillation occurs.
Figure 7:
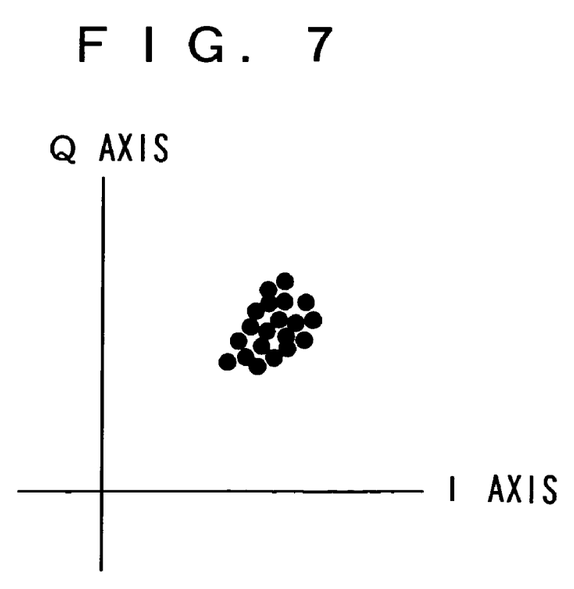
FIG. 7 is a diagram for illustrating a situation of signal points when the parasitic oscillation occurs.

Alternatively, a local oscillator of a converter has been normally operated from the start of a period of purchase time for an antenna but deterioration of oscillation characteristics of the local oscillator due to long-term deterioration, with it is exposed to the outside air for a long time, such as moisture entry thereinto due to deterioration in its waterproof and a loose contact of ground due to repetition of temperature changes may occur, so that parasitic oscillation as shown in FIG. 6 can occur. FIG. 6 is a diagram for illustrating oscillation spectrum when the parasitic oscillation occurs. According to a test result, it is appreciated that as shown in FIG. 7, signal points of phase mapping of the baseband signal spread in a radial direction. In this case, because of the same reasons like the above, this becomes a factor in deterioration of its receiving characteristics.

DISCLOSURE OF THE INVENTION

In the conventional apparatus for receiving digital satellite signal as described above, however, there is no how to automatically determine a factor in the deterioration of its receiving characteristics, so that a best measure for improving these deteriorations automatically cannot be taken.

Thus, there is, conventionally, only a measure that a servicing person responds thereto separately. In this case, it is possible to improve the deterioration in the receiving characteristics by adjusting a value of register in the demodulator using a special mode (servicing mode) that is operable by the servicing person, but it has a problem in a cost such that the servicing person responds thereto separately.

Further, if receiving characteristics is deteriorated due to phase noise in the local oscillator of frequency converter accompanied with the antenna and parasitic oscillation thereof, it is possible to respond thereto by purchase a new antenna in a most case, but it has such a problem that a cost therefor is requested or the replacement thereof cannot be easily carried out in a case of community antenna system.

This invention has thus an object to provide an apparatus and a method for receiving digital broadcast signal by which a factor in deterioration for receiving characteristics of an antenna can be automatically determined and deterioration for receiving characteristics due to phase noise of a local oscillator in a frequency converter accompanied with the antenna and parasitic oscillation thereof can be automatically improved.

An apparatus for receiving a digital broadcast signal relative to the invention is an apparatus for receiving a digital broadcast signal that is available to receive a digital satellite broadcast signal via an antenna comprising detecting circuit for orthogonally detecting a received signal sent from the antenna to a baseband signal, carrier/noise (C/N)-value-calculating circuit for measuring an average value of amplitude in radial direction of signal points of phase mapping of the baseband signal obtained by the detecting circuit to calculate a carrier/noise ratio for the received signal, phase-noise-amount-calculating circuit for measuring an average value of amplitude in circumferential direction of signal points of the phase mapping of the baseband signal to calculate an amount of phase noise of the received signal, bit-error-rate-measuring circuit for measuring a bit-error rate of transport stream that is given by demodulating the baseband signal, determining circuit for determining a factor in deterioration for receiving characteristics of the antenna based on results of the C/N-value-calculating circuit, the phase-noise-amount-calculating circuit, and the bit-error-rate-measuring circuit, and measure-mode-setting circuit for setting a desired measure mode based on the determination result of the determining circuit.

For example, the measure mode includes a first measure mode responding to a case where carrier/noise ratio is low; a second measure mode for improving deterioration for receiving characteristics due to phase noise of local oscillator in a frequency converter accompanied with the antenna; and a third measure mode for improving deterioration for receiving characteristics due to parasitic oscillation of the local oscillator in the frequency converter accompanied with the antenna.

A method for receiving a signal relative to the present invention is a method for receiving a signal in an apparatus for receiving a digital broadcast signal that is available to receive a digital satellite broadcast signal via an antenna, the method comprising: detection step of orthogonally detecting a received signal sent from the antenna to a baseband signal, carrier/noise (C/N)-value-calculating step of measuring an average value of amplitude in radial direction of signal points of phase mapping of the baseband signal obtained in the detection step to calculate a carrier/noise ratio for the received signal, phase-noise-amount-calculating step of measuring an average value of amplitude in circumferential direction of signal points of the phase mapping of the baseband signal to calculate an amount of phase noise of the received signal, bit-error-rate-measuring step of measuring a bit-error rate of transport stream that is given by demodulating the baseband signal, determining step of determining a factor in deterioration for receiving characteristics of the antenna based on results of the C/N-value-calculating step, the phase-noise-amount-calculating step, and the bit-error-rate-measuring step, and measure-mode-setting step of setting a desired measure mode based on the determination result of the determining step.

According to the present invention, the C/N-value-calculating circuit, the phase-noise-amount-calculating circuit, and the bit-error-rate-measuring circuit are provided; when receiving the signal, a received signal sent from the antenna is orthogonally detected to a baseband signal; an average value of amplitude in radial direction of signal points of phase mapping of the obtained baseband signal is then measured to calculate a C/N value for the received signal; an average value of amplitude in circumferential direction of signal points of the phase mapping of the baseband signal is measured to calculate an amount of phase noise of the received signal; a bit-error rate of transport stream that is given by demodulating the baseband signal is then measured; a factor in deterioration for receiving characteristics of the antenna is determined based on these results; and a desired measure mode is set based on the determination result thereof. This allows a factor in deterioration for receiving characteristics of the antenna to be automatically determined and the deterioration for receiving characteristics due to phase noise of local oscillator in a frequency converter accompanied with the antenna and parasitic oscillation thereof to be automatically improved.

BEST MODE FOR CARRYING OUT THE INVENTION

Figure 8:
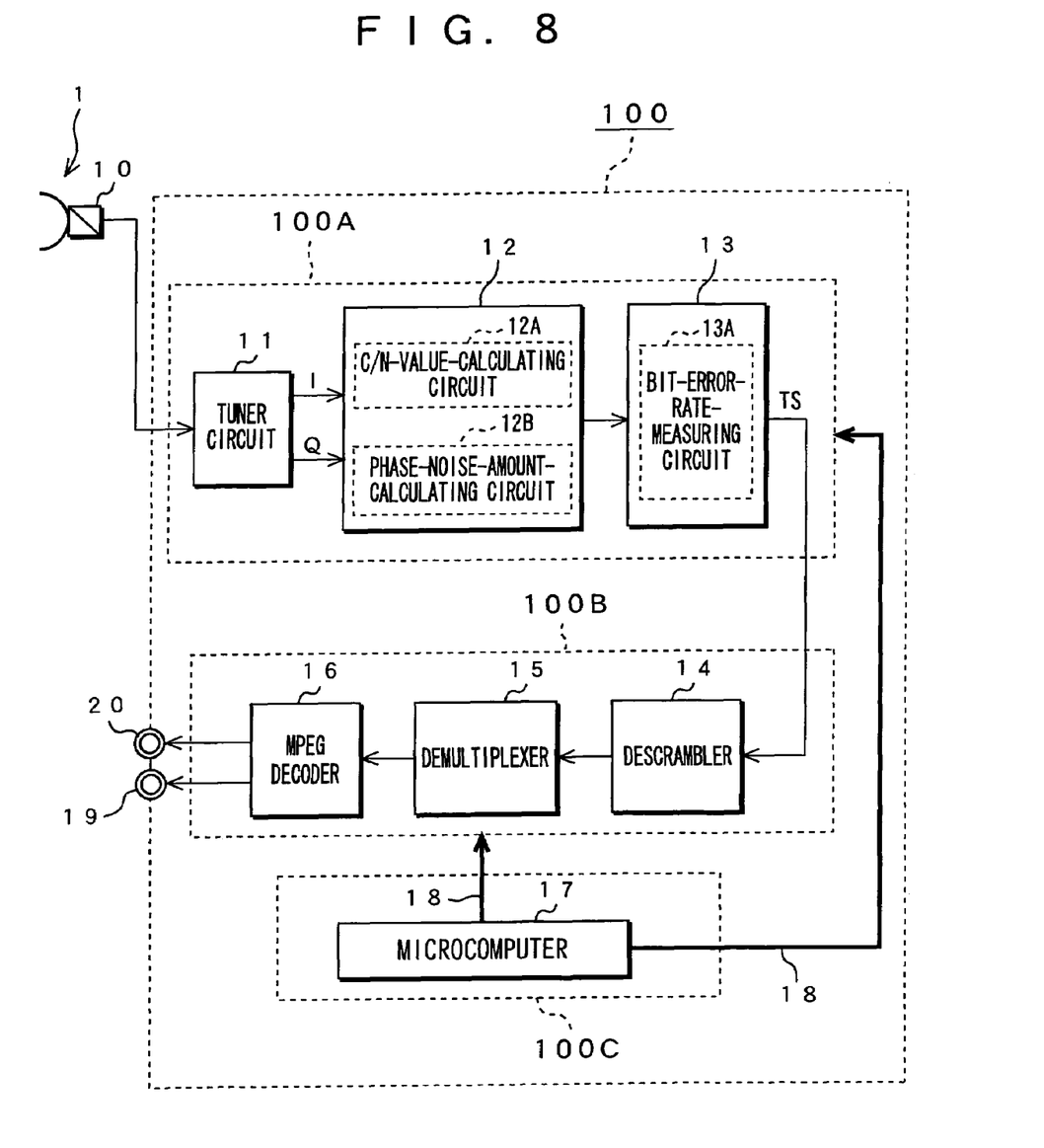
FIG. 8 is a diagram for illustrating a configuration of an apparatus for receiving digital broadcast signal as an embodiment thereof.

The following will describe one embodiment of the present invention with reference to drawings. FIG. 8 shows a configuration of an apparatus 100 for receiving digital broadcast signal as an embodiment of the invention. This apparatus 100 for receiving digital broadcast signal is a receiver for receiving BS digital signal.

As shown in FIG. 8, the apparatus 100 for receiving digital broadcast signal has a front-end portion 100A, back-end portion 100B, and a controlling portion 100C. The front-end portion 100A has a tuner circuit 11, a demodulation circuit 12, and an error-correction circuit 13. The back-end portion 100B has a descrambler 14, a demultiplexer 15, and an MPEG decoder 16. The controlling portion 100C has a microcomputer 17.

The tuner circuit 11 is a circuit in which target broadcast signal is tuned from broadcast signal (BS-IF signal) that has been sent from an antenna 1 through a frequency converter (LNB) 10 and amplitude processing or the like is performed thereon to convert to a baseband signal (I, Q).

The demodulation circuit 12 is a circuit in which the baseband signal output from the tuner 11 is demodulated to provide transport stream (TS). This demodulation circuit 12 includes a well-known circuit system such as a trellis coded 8 phase shift keying (TC8PSK) decoder.

The demodulation circuit 12 also has carrier/noise (C/N)-value-calculating circuit 12A for measuring an average value of amplitude in radial direction of signal points of phase mapping of the baseband signal given by the tuner 11 to calculate a CN value for the received signal and phase-noise-amount-calculating circuit 12B for measuring an average value of amplitude in circumferential direction of signal points of the phase mapping of the baseband signal to calculate an amount of phase noise of the received signal.

The error-correction circuit 13 is a circuit for correcting an error in the transport stream that is generated during signal transmission. By processing of the error-correction circuit 13, stable reception of a signal can be given even if carrier to noise (C/N) ratio of the received signal is low.

The error-correction circuit 13 also includes bit-error-rate-measuring circuit 13A for measuring a bit-error rate of the transport stream that is given by demodulating the baseband signal.

The descrambler 14 is a circuit for descrambling a scrambled signal. The demultiplexer 15 separates, from the transport stream, video and audio signals that are encoded in a moving picture experts group (MPEG) scheme, and supplies them to the MPEG decoder 16 as a signal for contents.

The MPEG decoder 16 decodes the signals for contents (video and audio signals) that are encoded in MPEG scheme. The video and audio signals that are obtained by the MPEG decoder 16 are respectively supplied to a video output terminal 20 and an audio output terminal 19 by which an image due to the video signal is displayed on a screen in a monitor device.

As everyone knows, the microcomputer 17 has a CPU, an ROM, and an RAM (they are not shown). The CPU is connected with a system bus 18 and controls an entire operation of the apparatus 100 for receiving digital broadcast signal according to information in a controlling program stored on the ROM with the RAM being used as a working area.

The microcomputer 17 serves as determining circuit for determining a factor in deterioration for performance of the antenna 1 based on calculation results of the C/N-value-calculating circuit 12A and the phase-noise-amount-calculating circuit 12B, and the measured result of the bit-error-rate-measuring circuit 13A, and as measure-mode-setting circuit for setting a desired measure mode based on the determination result of the determining circuit.

When receiving BS digital signal, the antenna 1 first receives electronic magnetic wave of 12 GHz band that is transmitted from any BS satellite and the frequency converter 10 accompanied with the antenna 1 down-converts the received signal to L (1 GHz through 2 GHz) band. The signal thus down-converted is sent to the apparatus 100 for receiving digital broadcast signal.

This apparatus 100 for receiving digital broadcast signal first extracts a desired transponder signal among signals over the L band by the tuner circuit 11 of the front-end portion 100A and then converts it in frequency to a baseband one. The baseband signal (I, Q) thus converted is supplied to the demodulation circuit 12 where it is demodulated in 8PSK demodulation scheme. The signal thus demodulated is supplied to the error-correction circuit 13 where an error in the transport stream occurred during the signal transmission is corrected. The signal thus error-corrected is sent to the back-end portion 100B as the transport stream (TS).

In the back-end portion 100B, video and audio signals are reproduced and output by the descrambler 14, the demultiplexer 15, and the MPEG decoder 16. It is to be noted that when receiving the signal, each device can be controlled by the microcomputer 17.

When thus receiving the signal, as described above, signal points of the baseband signal spread as shown in FIG. 3, so that the C/N-value-calculating circuit 12A provided within the demodulation circuit 12 can measure an average value of amplitude in radial direction of the signal points to obtain the C/N value. (It is assumed that a register indicating this value of the demodulation circuit 12 (demodulation IC) is referred to as CN register and that the larger this value, the larger the C/N value)

If the C/N value is decreased, an amount of error in the transport stream (TS) output from the front-end portion 100A is increased, so that bit-error rate (BER) deteriorates, which finally leads to deterioration for receiving characteristics such as block noise in a screen. (It is to be noted that such the situation is referred to as "C/N Low mode".)

How to obtain the C/N value is based on an assumption of random noise that a noise such as thermal noise is found in normal distribution and if C/N value is reduced because of augmentation of the thermal noise, the signal points of phase mapping of the baseband signal spread in a shape of a perfect circle centering around each of the signal points shown in FIG. 1, as seen from these signal points (see FIG. 3). Specifically, by measuring amplitude in radial direction of a circle of phase mapping shown in FIG. 1, a value of the CN register is obtained. It is to be noted that measurement of the average value of the amplitude is made by a unit of some periods of msec, for example.

Actually, however, there may be some case where another noise is overlapped with the signal, and it is known that in this case, the noise cannot be estimated by only the C/N value. For example, if a local oscillator of the frequency converter 10 has large amount of phase noise as shown in FIG. 4, such the phase noise is overlapped with the received signal of the apparatus 100 for receiving the digital broadcast signal as it is, but since the phase noise includes noise component having deviation in its frequency components, it is known that the signal points of the phase mapping of the baseband signal spread in a circumferential direction as shown in FIG. 5. In this case, the above CN register has not measured an average value of the amplitude in the circumferential direction, so that a disadvantage occurs such that a bit-error rate of the transport stream deteriorates regardless a value of the CN register remains unchanged.

In such a case, it is impossible to detect augmentation in an amount of phase noise properly and thus, how to detect its deviation thereof in the circumferential direction is required. Therefore, it is enable to obtain an amount of the phase noise by measuring this average value of the amplitude in the circumferential direction. (A register indicating this is referred to as "PN register" and the larger this value, the larger the amount of phase noise.) It is to be noted that measurement of the average of the amplitude is made by a unit of some hundreds of msec, for example.

As described above, if the amount of phase noise is increased, bit-error rate of the transport stream deteriorates, which leads to deterioration for receiving characteristics. (It is to be noted that this situation is referred to as "phase noise mode".)

Alternatively, if parasitic oscillation occurs in a local oscillator of the frequency converter 10, a large number of oscillations sideways a desired oscillation may be found, for example, as shown in FIG. 6. In such a case, this affects the received signal of the apparatus 100 for receiving the digital broadcast signal as noise, which leads to deterioration for receiving characteristics, but PN register of the demodulator does not deteriorate and there shows a symptom like C/N Low mode (in which C/N value of the received signal is decreased). In this case, since it is impossible to distinguish this from C/N Low mode by only the CN register, another detection method therefor is required (A situation of which is referred to as parasitic oscillation mode.)

In the above-described C/N Low mode, it is impossible to improve the deterioration for receiving characteristics while in the phase noise mode and the parasitic oscillation mode, it is possible to improve the deterioration for receiving characteristics by changing a constant of carrier tracking loop in the demodulation circuit 12 such as a band width of the noise and a dumping factor. Specifically, by making the band width of the noise wider and/or the dumping factor larger, it is possible to improve the receiving characteristics.

It, however, is known that changes of these constants produce side effects, so that as values thereof increase, its immunity against C/N of the received signal degrades. Namely, since a situation further worsens if changes of these constants are made in C/N Low mode, any change more than necessary one cannot be made, which results in fixing it to its default setting. (Such the setting is referred to as "measure mode 1".) In this case, band width of the noise is set to A1 and dumping factor is set to B1.

It is also known that in the parasitic oscillation mode, it proves ineffectiveness unless these values are made larger than those in phase noise mode, so that it is necessary to classify them. (It is to be noted that measure mode in phase noise mode is referred to as "measure mode 2". In this case, band width of the noise is set to A2 (A2>A1) and dumping factor is set to B2 (B2>B1). It is to be noted that measure mode in parasitic oscillation mode is referred to as "measure mode 3". In this case, band width of the noise is set to A3 (A3≧A2) and dumping factor is set to B3 (B3>B2).

Figure 9:
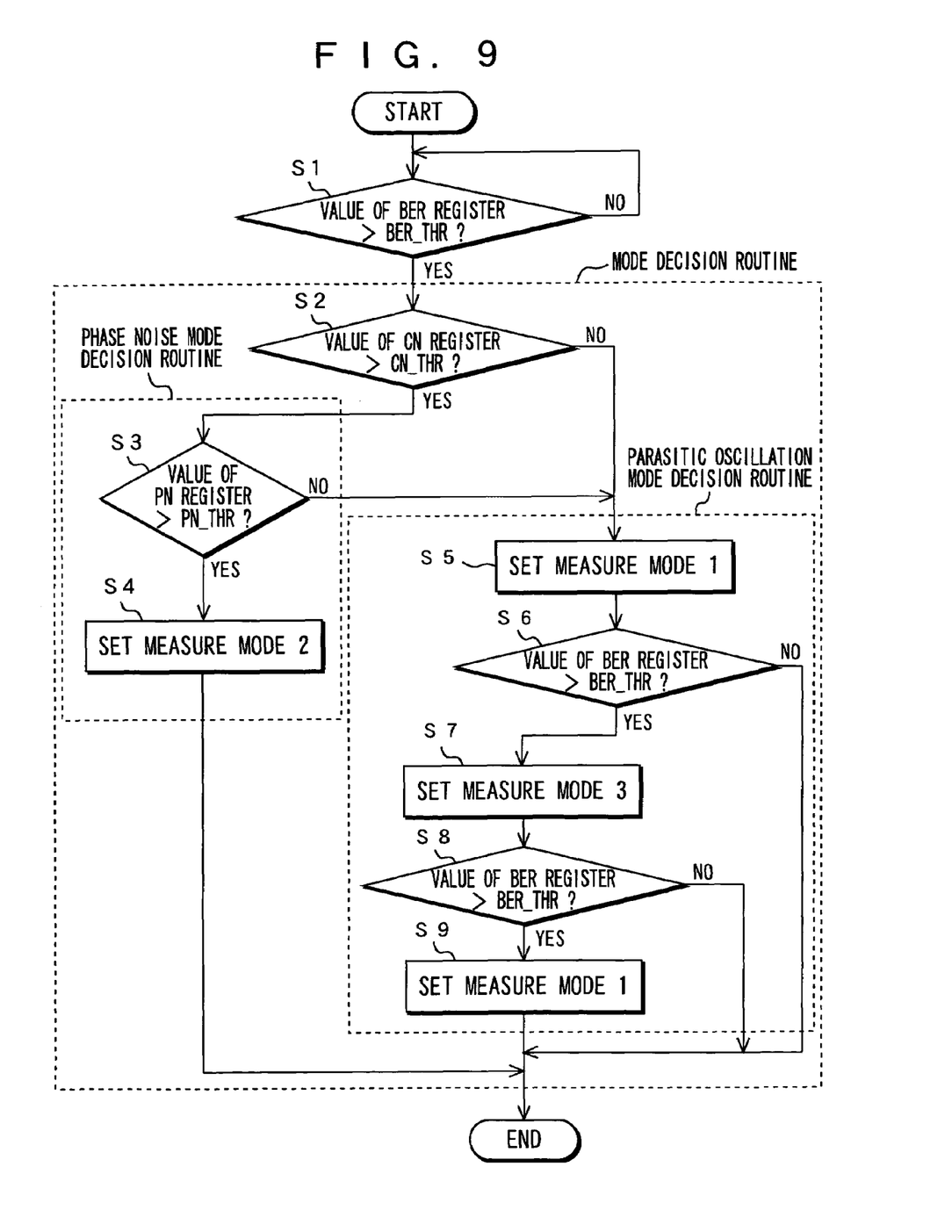
FIG. 9 is a flowchart for showing an operation example of an apparatus 100 for receiving digital broadcast signal.

Next, the following will describe operations of the apparatus 100 for receiving the digital broadcast signal with reference to FIG. 9. FIG. 9 is a flowchart for showing an operation example of the apparatus 100 for receiving the digital broadcast signal. Herein, it is the operation example of the invention to determine a mode (either C/N Low mode, phase noise mode or parasitic oscillation mode) in which deterioration for receiving characteristics occurs in the apparatus 100 for receiving the digital broadcast signal when receiving the signal and to set a measure mode corresponding thereto.

When receiving the signal, at step S1, the microcomputer 17 first checks a value of bit-error rate (BER) register that measures BER of transport stream (TS) output from the demodulation circuit 12 and then, if the value of BER register is larger than a predetermined set threshold value (BER_THR), then it is determined that deterioration for receiving characteristics occurs and the process enters into a mode decision routine.

Next, in the mode decision routine, at step S2, it begins by determining whether a C/N value of CN register is larger than a predetermined set threshold value (CN_THR). If the C/N value is larger than the threshold value (CN_THR), then it is deemed to be not effected by side-effects due to changes in the band width of the noise and the dumping factor and the process enters into a phase noise mode decision routine and goes to step S3. It is to be noted that if the C/N value is not larger than the threshold value (CN_THR), the process enters into a parasitic oscillation mode decision routine and goes to step S5.

In the phase noise mode decision routine, at step S3, it begins by determining whether a value of PN register is larger than a predetermined set threshold value (PN_THR). If the value of PN register is larger than the threshold value (PN_THR), then it is deemed as deterioration for receiving characteristics due to phase noise and the process goes to step S4. At step S4, it sets measure mode 2 and the operation then finishes. It is to be noted that if it is determined at step S3 that the value of PN register is not larger than the threshold value (PN_THR), the process enters into the parasitic oscillation mode decision routine and goes to step S5.

In the parasitic oscillation mode decision routine, it is impossible to decide which a current mode is the C/N Low mode or the parasitic oscillation mode by only checking values of the CN register and the PN register. Therefore, at step S5, it begins by setting measure mode 1 (a measure for C/N Low mode). At step S6, it is then determined whether a value of BER register is larger than a predetermined set threshold value (BER_THR). If it is determined that the value of BER register is not larger than the threshold value (BER_THR), namely, if the value of BER register is improved to decrease so that it can be not larger than the threshold value (BER_THR), the setting at step S5 is accepted and the operation finishes.

It is to be noted that if it is determined at step S6 that the value of BER register is larger than the threshold value (BER_THR), then it sets measure mode 3 (a measure for the parasitic oscillation mode) at step S7.

At step S8, it is again determined whether a value of BER register is larger than a predetermined set threshold value (BER_THR). If it is determined that the value of BER register is larger than the threshold value (BER_THR), it is determined as deterioration of receiving characteristics due to a considerable low level of C/N, not parasitic oscillation, and at step S9, it sets measure mode 1 (a measure for C/N Low mode) and the operation finishes. It is to be noted that if it is determined at step S8 that the value of BER register is not larger than the threshold value (BER_THR), then it is determined that the value of BER register is improved to decrease so that it can be not larger than BER_THR and thus, the deterioration of receiving characteristics is based on the parasitic oscillation, and then the process finishes.

Due to the above operation, each of the three modes can be automatically determined and the deterioration of receiving characteristics in the phase noise mode and the parasitic oscillation mode can be automatically improved.

Although it has been described that if it is determined at the above step S3 that the value of PN register is not larger than the threshold value (PN_THR), then the process enters into the parasitic oscillation mode decision routine and goes to step S5, the invention is not limited to this. For example, if it is determined at step S3 that the value of PN register is not larger than the threshold value (PN_THR), the operation may finishes soon.

Thus, according to the embodiment, the apparatus 100 for receiving the digital broadcast signal has the C/N-value-calculating circuit 12A, the phase-noise-amount-calculating circuit 12B, and the bit-error-rate-measuring circuit 13A; when receiving the signal, a received signal sent from the antenna is orthogonally detected to a baseband signal; an average value of amplitude in radial direction of signal points of phase mapping of the obtained baseband signal is then measured to calculate a C/N value for the received signal; an average value of amplitude in circumferential direction of signal points of the phase mapping of the baseband signal is measured to calculate an amount of phase noise of the received signal; a bit-error rate of transport stream that is given by demodulating the baseband signal is then measured; a factor in deterioration for performance of the antenna 1 is determined based on these results; and a desired measure mode is set based on the determination result thereof.

This allows a factor in deterioration for receiving characteristics of the antenna 1 to be automatically determined and the deterioration for receiving characteristics due to phase noise of local oscillator in the frequency converter 10 accompanied with the antenna 1 and the parasitic oscillation thereof to be automatically improved.

Further, since it is possible to take measures on phase noise and parasitic oscillation of the frequency converter 10 automatically, separate response by the servicing person is made unnecessary.

Even if deterioration of receiving characteristics due to phase noise and parasitic oscillation of the frequency converter 10 occurs, it is unnecessary to respond thereto by replacing the antenna with a new antenna.

Although the apparatus 100 for receiving the digital broadcast signal has related to an apparatus for receiving BS digital signal in the above embodiment, this invention is also applicable to an apparatus for receiving CS digital signal.

Further, 8PSK signal modulation scheme has been described in the above embodiment, the invention is not limited to this. For example, this invention is applicable to QPSK signal modulation scheme or the like.

According to the invention, the apparatus for receiving the digital broadcast signal has the C/N-value-calculating circuit, the phase-noise-amount-calculating circuit, and the bit-error-rate-measuring circuit; when receiving the signal, a received signal sent from the antenna is orthogonally detected to a baseband signal; an average value of amplitude in radial direction of signal points of phase mapping of the obtained baseband signal is then measured to calculate a C/N value for the received signal; an average value of amplitude in circumferential direction of signal points of the phase mapping of the baseband signal is measured to calculate an amount of phase noise of the received signal; a bit-error rate of transport stream that is given by demodulating the baseband signal is then measured; a factor in deterioration for receiving characteristics of the antenna 1 is determined based on these results; and a desired measure mode is set based on the determination result thereof, by which a factor in deterioration for receiving characteristics of the antenna 1 can be automatically determined and the deterioration for receiving characteristics due to phase noise of local oscillator in a frequency converter accompanied with the antenna and the parasitic oscillation thereof can be automatically improved.

Further, since it is possible to take measures on phase noise and parasitic oscillation of a frequency converter of an antenna automatically, separate response by the servicing person is made unnecessary.

Even if deterioration of receiving characteristics due to phase noise and parasitic oscillation of a frequency converter of an antenna occurs, it is unnecessary to respond thereto by replacing the antenna with a new antenna.

INDUSTRIAL APPLICABILITY

A factor of deterioration of receiving characteristics by an antenna can be automatically determined, and the deterioration of receiving characteristics due to phase noise and parasitic oscillation of a frequency converter of frequency converter accompanied with an antenna can be automatically improved, thus being well suited for an apparatus and a method for receiving digital broadcast signal relative to BS digital and CS digital.

The invention claimed is:

1. An apparatus for receiving a digital broadcast signal that is available to receive a digital satellite broadcast signal via an antenna comprising:
a detecting circuit configured to orthogonally detect a received signal sent from the antenna to a baseband signal;
a carrier/noise (C/N)-value-calculating circuit configured to measure an average value of amplitude in a radial direction of signal points of phase mapping of the baseband signal obtained by the detecting circuit to calculate a carrier/noise ratio for the received signal;
a phase-noise-amount-calculating circuit configured to measure an average value of amplitude in a circumferential direction of signal points of the phase mapping of the baseband signal to calculate an amount of phase noise of the received signal;
a bit-error-rate-measuring circuit configured to measure a bit-error rate of transport stream that is given by demodulating the baseband signal;
a determining circuit configured to determine a factor in deterioration for receiving characteristics of the antenna based on results of the C/N-value-calculating circuit, the phase-noise-amount-calculating circuit, and the bit-error-rate-measuring circuit; and
a measure-mode-setting circuit configured to set a desired measure mode based on the determination result of the determining circuit.

2. The apparatus for receiving a digital broadcast signal according to claim 1 wherein the measure-mode-setting circuit is configured to set the desired measure mode to one of:
a first measure mode responding to a case where carrier/noise ratio is low;
a second measure mode for improving deterioration for receiving characteristics due to phase noise of local oscillator in a frequency converter accompanied with the antenna; and
a third measure mode for improving deterioration for receiving characteristics due to parasitic oscillation of the local oscillator in the frequency converter accompanied with the antenna.

3. A method for receiving a signal in an apparatus for receiving a digital broadcast signal that is available to receive a digital satellite broadcast signal via an antenna, the method comprising:
orthogonally detecting a received signal sent from the antenna to a baseband signal;
measuring an average value of amplitude in a radial direction of signal points of phase mapping of the baseband signal obtained in the orthogonally detecting to calculate a carrier/noise ratio for the received signal;
measuring an average value of amplitude in a circumferential direction of signal points of the phase mapping of the baseband signal to calculate an amount of phase noise of the received signal;
measuring a bit-error rate of transport stream that is given by demodulating the baseband signal;
determining a factor in deterioration for receiving characteristics of the antenna based on results of the measuring an average value of amplitude in a radial direction, measuring an average value of amplitude in a circumferential direction, and measuring a bit error rate; and
setting a desired measure mode based on the determination result of the determining.

4. The apparatus for receiving a digital broadcast signal according to claim 2 wherein the detecting circuit is configured to set a bandwidth of noise in the second measure mode to a value greater than a bandwidth of the noise in the first measure mode.

5. The apparatus for receiving a digital broadcast signal according to claim 2 wherein the detecting circuit is configured to set a bandwidth of noise in the third measure mode to a value greater than or equal to a bandwidth of the noise in the second measure mode.

6. The apparatus for receiving a digital broadcast signal according to claim 2 wherein the detecting circuit is configured to set a dumping factor in the second measure mode to a value greater than a dumping factor in the first measure mode.

7. The apparatus for receiving a digital broadcast signal according to claim 2 wherein the detecting circuit is configured to set a dumping factor in the third measure mode to a value greater than or equal to a dumping factor in the second measure mode.

* * * * *